April 26, 1966  D. G. ROGERS  3,248,612

CAPACITOR ELECTRODE AND METHOD

Filed July 23, 1962

INVENTOR.
DONALD G. ROGERS
BY
Connolly and Hutz
ATTORNEYS

United States Patent Office 3,248,612
Patented Apr. 26, 1966

3,248,612
CAPACITOR ELECTRODE AND METHOD
Donald G. Rogers, Pownal, Vt., assignor to Sprague Electric Company, North Adams, Mass., a corporation of Massachusetts
Filed July 23, 1962, Ser. No. 213,572
3 Claims. (Cl. 317—230)

This application is a continuation-in-part of my copending now abandoned application Serial No. 517,135, filed June 22, 1955. This invention relates to a pellet-type electrode for electrical capacitors and to a method of making the same, and more particularly to a high-purity pellet-type electrode construction which is economical of tantalum metal.

Pellet-type capacitor electrodes that are known to the art are comprised of particles of valve-metal, such as tantalum, that are pressed and sintered into a porous mass. A technical shortcoming of the prior art electrodes involves the reproducibility and purity of the starting particles, which may contain minor amounts of impurities because of the processes involved in producing the particles. A more serious shortcoming of the prior art electrodes involves the rapidly expanding use of tantalum from extremely limited known sources of tantalum that are expected to be exhausted within the next decade or two.

It is an object of this invention to provide a capacitor electrode having a known and reproducible high degree of purity.

It is another object of this invention to provide a capacitor electrode that affords a substantial economy of tantalum for a given electrical rating.

Figure 1:
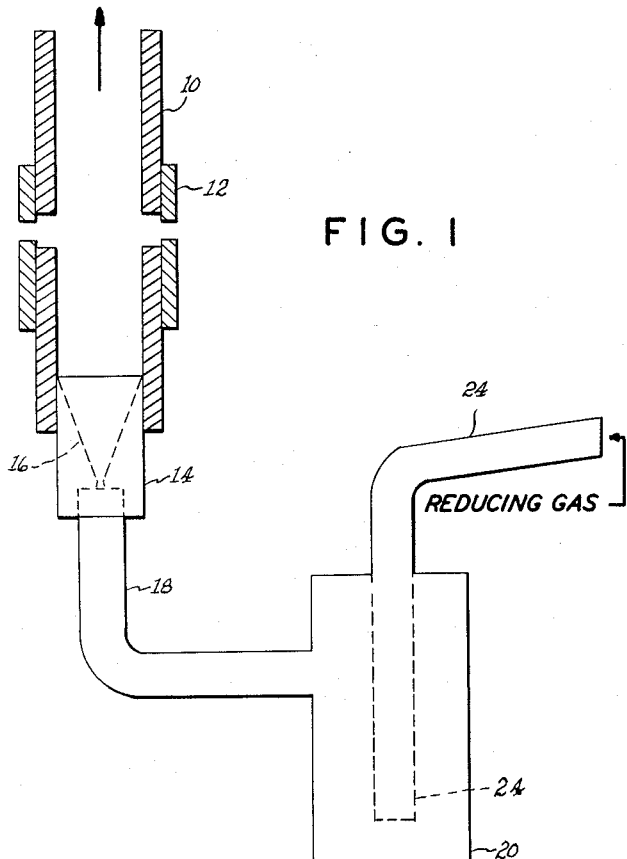
Figure 2:
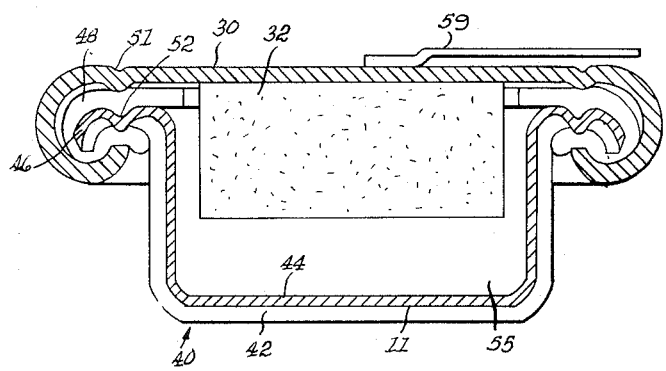

These and other objects of this invention will become more apparent upon consideration of the following description and claims taken together with the accompanying drawing, wherein:

FIGURE 1 shows in diagrammatic form a technique for preparing tantalum electrodes in accordance with this invention; and FIGURE 2 is a sectional view illustrating a complete capacitor representative of this invention.

In general, the objects of this invention are attained in a capacitor having a sintered tantalum electrode comprising substantially uniform minute particles of inert refractory material covered with a continuous film coating of elemental tantalum. More specifically, this invention provides a capacitor electrode wherein tantalum coated particles are sintered together to effect a substantial economy of tantalum, and also an efficiency immovement by providing surfaces that are reproducibly superior to the surfaces of prior art tantalum particles.

More specifically, this invention relates to a capacitor employing a porous electrode comprised of substantially uniform minute spherical refractory particles smaller than about 5 mils in size and which are provided with relatively thick continuous molecular deposits of elemental tantalum, at least about 1/10 mil thick. The tantalum coated particles are pressed and sintered to provide an electrode structure that may be "filmed" or "formed" in conventional electrolytic capacitor fashion, and which may be impregnated with suitable electrolytes both solid and liquid.

According to the preferred embodiment of the present invention, an electrolytic capacitor has an anode of tantalum coated ceramic particles that are pressed and sintered together into a porous mass. The ceramic particles are uniform and preferably smaller than about 5 mils in size; and the continuous tantalum coating is preferably at least about 1/10 mil thick. The tantalum coating is preferably deposited in a surface catalyzed chemical reaction. The coating process is a vapor phase reaction that is catalyzed by hot ceramic surfaces, and is produced by passing a reducing gas over the heated ceramic particles after contacting the gas with a tantalum compound that is reducible to elemental tantalum. The ceramic particles are heated to a temperature at which the reduction takes place, and the tantalum compound is heated to facilitate pick-up by the carrier gas. The hot ceramic surface catalyzes the vapor phase reaction between the volatile tantalum compound and the reducing gas.

FIGURE 1 shows a suitable apparatus for the present invention in which a nickel tube 10 is provided with a heated jacket 12 and a gas inlet plug 14. The heated jacket 12 is made of asbestos, or fire-clay or the like, and has electric heater coils embedded therein together with a thermocouple or other temperature measuring device. The gas inlet plug 14 has an internal orifice 16 which is only about 1/16 inch long and is provided with a snug fit within tube 10, as by threading or welding or cementing. A conduit 18 connects plug 14 with a vaporizing chamber 20 containing a quantity of a vaporizable and reducible tantalum compound 22. A supply line 24 leads a reducing gas into chamber 20 and projects the gas onto the surface of the reducible material 22. Chamber 20 can also be provided with a heating means, such as electric heater coil or heat exchange shell or the like, so that the reducible material is more readily vaporized and carried along by the gas.

In operation a quantity of a reducible tantalum compound, such as tantalum chloride or tantalum bromide, is introduced into chamber 20 and a mass of ceramic particles is dropped into the tube 10. The reducing gas, such as hydrogen, is introduced through supply line 24 under sufficient pressure to keep the ceramic particles suspended in tube 10.

As a specific example, it has been found that a flow rate of about 70 liters/minute of hydrogen will maintain the suspension of ceramic particles that pass 200 mesh and hold on 230 mesh (U.S. Standard Sieve Series) in a tube 10 that has a cylindrical internal wall diameter of 1/2 inch. To facilitate vaporization of the tantalum compound, chamber 20 is maintained at an elevated temperature, for example, for tantalum chloride chamber 20 is maintained at 220 to 230° C. To ensure the reaction that deposits elemental tantalum on the ceramic particles, the tube 10 is maintained at a temperature of about 800° C. Under these conditions, a pure tantalum deposit of at least 1/10 mil is obtained on the ceramic particles in about 135 minutes. The size of the ceramic particles and the thickness of the pure tantalum film result in tantalum coated particles that contain about 41% tantalum, based on the weight of the ceramic.

The tantalum coated particles of this invention are not subject to the uncertainties of conventional tantalum metallurgy. By providing a distilled tantalum compound, such as the pentachloride, a highly effective tantalum coating of high purity and reproducibility is obtained at relatively low cost. Only about 1/4 the tantalum is utilized to provide the same electrical ratings as compared with standard compressed tantalum powder electrodes of the prior art.

The process and apparatus of this invention are economical of tantalum over and above the reduction in the amount of tantalum utilized for each particle. Excess tantalum deposited on tube 10 are discharged from the outlet of the tube is readily recovered and re-used. The nickel walls of tube 10 introduce no contamination in the final deposit even though the deposition is carried out at the temperature of about 800° C. or higher.

The tantalum coatings of this invention are extremely thin, being in the order of fractions of a mil, so as to effect the substantial reduction in the amount of tantalum required. Nevertheless, the tantalum coatings are thick with relation to the size of the ceramic particles, so that the resulting coated particle is about 40% tantalum. Where the tantalum coatings are less than about ½ mil thick the available capacitance drops off unless the electrode is to be used at relatively low voltages, i.e. below about 50 volts. Even at low voltages, coatings of less than about 1/10 mil thick are not satisfactory.

The ceramic particles to be used in this invention are relatively small and substantially uniform to attain practical compactness. Thus, particles greater than about 5 mils require a much larger volume (when coated according to this invention) for a capacitance equal to that attained from solid tantalum particles. Almost any refractory material is suitable for this invention with alumina and magnesia being the preferred materials. In general, the ceramic has to be one that does not react at the sintering temperature of the pellet. In addition, materials that are sensitive to capacitor electrolytes must be avoided; however, the substantially anhydrous electrolytes have very little effect on refractory or ceramic materials. In addition to pure alumina, compounds of aluminum and alumina containing at least about 96% alumina are effective with this invention. While the preferred ceramic materials have been recited for best results, it will be understood that any inert material such as zirconia, titania, zirconium silicate, aluminum silicate, and silicon dioxide will provide satisfactory results.

The tantalum coated particles of this invention are pressed and sintered into pellet-type electrodes by procedures that are well known to the capacitor art. The sintering can be used to simultaneously sinter the particles to an electrical lead or support such as a sheet or wire. A sintering temperature of at least 1600° C. is desirable with the maximum temperature being generally just below the temperature at which tantalum melts or flows together. The sintering is carried out in either a vacuum or an inert atmosphere such as helium or argon.

The tantalum surfaces of the sintered pellet are oxidized or formed by anodic electrolytic treatment in a suitable electrolyte in a fashion well known to the electrolytic capacitor art. A typical formation electrolyte is a dilute (0.1 to 10%) solution of phosphoric acid in water. It will be understood that the specific electrolyte employed in forming the oxide dielectric film on the surface of the tantalum pellet it not a part of this invention. In general, any formation electrolyte that is known to the art as being suitable for pellet type electrodes of conventional pure tantalum construction may be employed with the tantalum-coated ceramic electrode of this invention.

It is a feature of this invention that the pure elemental tantalum coatings on the ceramic particles permits treatment to increase the surface area, for example, by etching or abrading. This treatment can be carried out on the individual tantalum coated particles or preferably after the coated particles are sintered together. Suitable etching techniques are described in U.S. Letters Patent 2,900,579 which was issued to me on August 18, 1959.

FIGURE 2 shows a typical capacitor employing an electrode of tantalum-covered particles produced in accordance with this invention as its anode. A tantalum sheet 30 has a pellet type block 32 of the tantalum-coated ceramic particles sintered to it, and has margin 34 curled over to provide the top lid of the capacitor housing 40. The remainder of housing 40 is shown as formed of a sheet steel casing 42 having a silver liner 44 within casing 42. The upper edge of housing 40 is flanged outwardly at 46 and is crimped within curled-over margin 34. A suitable gasket 48 of an inert material such as polytetrafluoroethylene is inserted between the lid and the casing to provide electrical insulation therebetween. Indentations or ribs 51 and 52 are provided in mating relationship on the crimped together portions to improve sealing of the capacitor.

Before sealing, the casing is substantially filled with a suitable electrolyte, such as an aqueous solution of phosphoric acid or ammonium sulfate or the like. Other suitable electrolytes include the acetate and formate electrolytes described in U.S. Letters Patent 2,759,131 issued August 14, 1956. In general, the electrolytes employed with tantalum pellet capacitors of the prior art can be used with the electrode of this invention. A notable exception to this generalization is that lithium chloride is not preferred when the ceramic particles are Alundum.

Pellet-type electrodes produced in accordance with this invention can also be utilized in the so-called "solid electrolyte" capacitors described in U.S. Letters Patent 2,936,514 issued May 17, 1960.

While this invention has been described in terms of tantalum coated ceramic pellets it will be understood that other valve-metal coatings can be utilized to provide somewhat lesser results. In general, any of the valve-metals can not be sprayed because of their high melting temperatures can be employed according to this invention, for example, niobium and niobium-tantalum alloys.

As many apparently widely different embodiments of this invention may be made without departing from the spirit and scope thereof, it is to be understood that the invention is not limited to the specific embodiments herein described except as defined in the appended claims.

What is claimed is:

1. An electrode for electrical capacitors comprising a porous pellet of sintered together tantalum-coated ceramic particles, said particles being substantially spherical and smaller than about 5 mils, said tantalum coating being a continuous film of a surface catalyzed vapor phase reaction, each resulting particle containing at least 40% by weight of ceramic, said resulting particles being sintered together.

2. A capacitor having a porous pellet-type anode, said anode comprising substantially spherical particles of refractory ceramic material, said particles being of such size that they pass 200 mesh and hold on 230 mesh, a surface catalyzed molecular vapor deposit of elemental tantalum on said particles, said deposit being at least about ½ mil thick, each resulting particle containing at least 40% tantalum by weight of ceramic, said resulting particles being sintered together in intimate electrical relation to an anode contact.

3. A method of forming tantalum-coated particles comprising heating a plurality of substantially uniform ceramic particles in a tube, suspending said particles within said tube in a gas stream, passing a reducing agent over a vaporizable and reducible tantalum compound, contacting said particles with said agent and said compound, whereby said particles catalyze a reaction between said agent and said compound to deposit a continuous film of tantalum on said particles in a proportion of at least 40% by weight of said ceramic.

References Cited by the Examiner

UNITED STATES PATENTS

| | | | |
|---|---|---|---|
| 553,296 | 1/1896 | Aylsworth | 117—107.2 |
| 2,299,228 | 10/1942 | Gray et al. | 317—230 |
| 2,406,345 | 8/1946 | Brennan | 317—230 |
| 2,578,667 | 12/1951 | Brennan | 317—230 |
| 2,616,165 | 11/1952 | Brennan | 317—230 |
| 2,749,255 | 6/1956 | Nack | 117—107.2 |
| 2,885,310 | 5/1959 | Olsen | 117—107.2 |

FOREIGN PATENTS 444,892  3/1936  Great Britain.

JOHN W. HUCKERT, *Primary Examiner.*

JAMES D. KALLAM, *Examiner.*